United States Patent [19]

Cunningham

[11] 4,070,032

[45] Jan. 24, 1978

[54] FOUR WHEEL PEDAL DRIVEN VEHICLE

[76] Inventor: William W. Cunningham, 7129 W. Mariposa St., Phoenix, Ariz. 85033

[21] Appl. No.: 587,055

[22] Filed: June 16, 1975

[51] Int. Cl.² ............................................. B62M 1/02
[52] U.S. Cl. ................................... 280/231; 280/237; 280/261; 280/269; 280/273; 280/279; 280/282; 280/202
[58] Field of Search ............... 280/231, 232, 236, 237, 280/238, 261, 267, 269, 273, 282; 74/218

[56] References Cited

U.S. PATENT DOCUMENTS

| | | | |
|---|---|---|---|
| 434,615 | 8/1890 | Warwick | 280/231 |
| 548,187 | 10/1895 | Fortney | 280/231 |
| 593,291 | 11/1897 | Binns | 280/273 |
| 1,297,796 | 3/1919 | Cheek | 280/231 X |
| 2,995,378 | 8/1961 | Whetstone | 280/261 X |
| 3,787,088 | 1/1974 | Dreyer | 280/281 X |
| 3,834,721 | 9/1974 | Gobby | 280/261 |

FOREIGN PATENT DOCUMENTS

| | | | |
|---|---|---|---|
| 698,120 | 1/1931 | France | 280/281 B |
| 47,331 | 8/1888 | Germany | 280/267 |
| 784,421 | 10/1957 | United Kingdom | 280/281 B |

Primary Examiner—John P. Silverstrim
Attorney, Agent, or Firm—M. Ted Raptes

[57] ABSTRACT

A four wheel, pedal driven vehicle particularly adapted for two persons seated in tandem, wherein each person alone or together can operate the vehicle by pedaling and steering. The vehicle comprises a unitary frame, a front spindle yoke assembly in combination with front handle bars and with front wheel forks of each front wheel, a steering control system in combination with the yoke assembly and rear handle bar means, a continuous drive chain assembly which is in combination with sprockets and pedals of both operator positions and which is in combination with transmission means and a rear drive assembly, whereby the drive chain can be driven from either tandem position. The vehicle has an associated body shell and cowls as well as conventional brakes, lights, etc.

3 Claims, 29 Drawing Figures

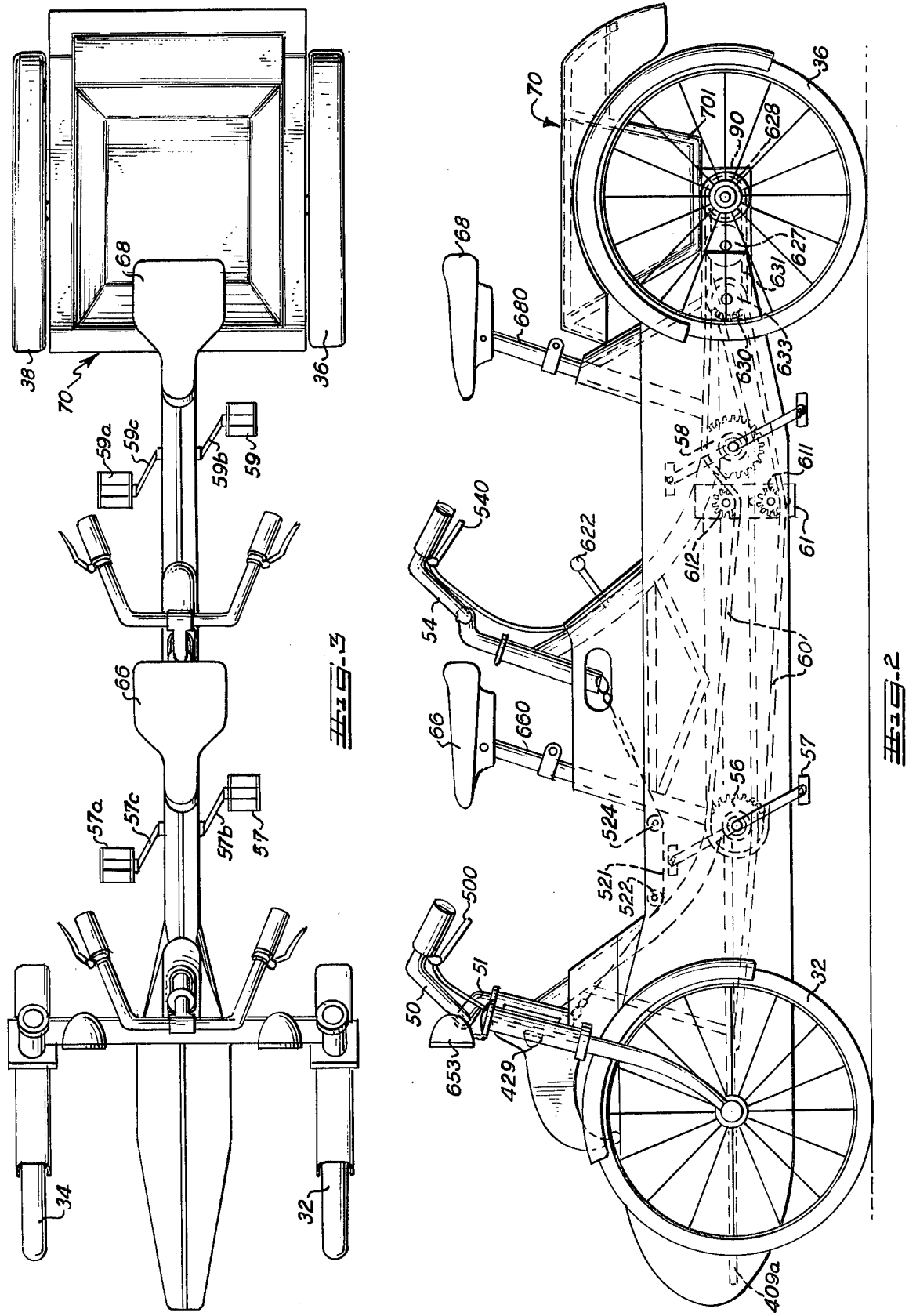

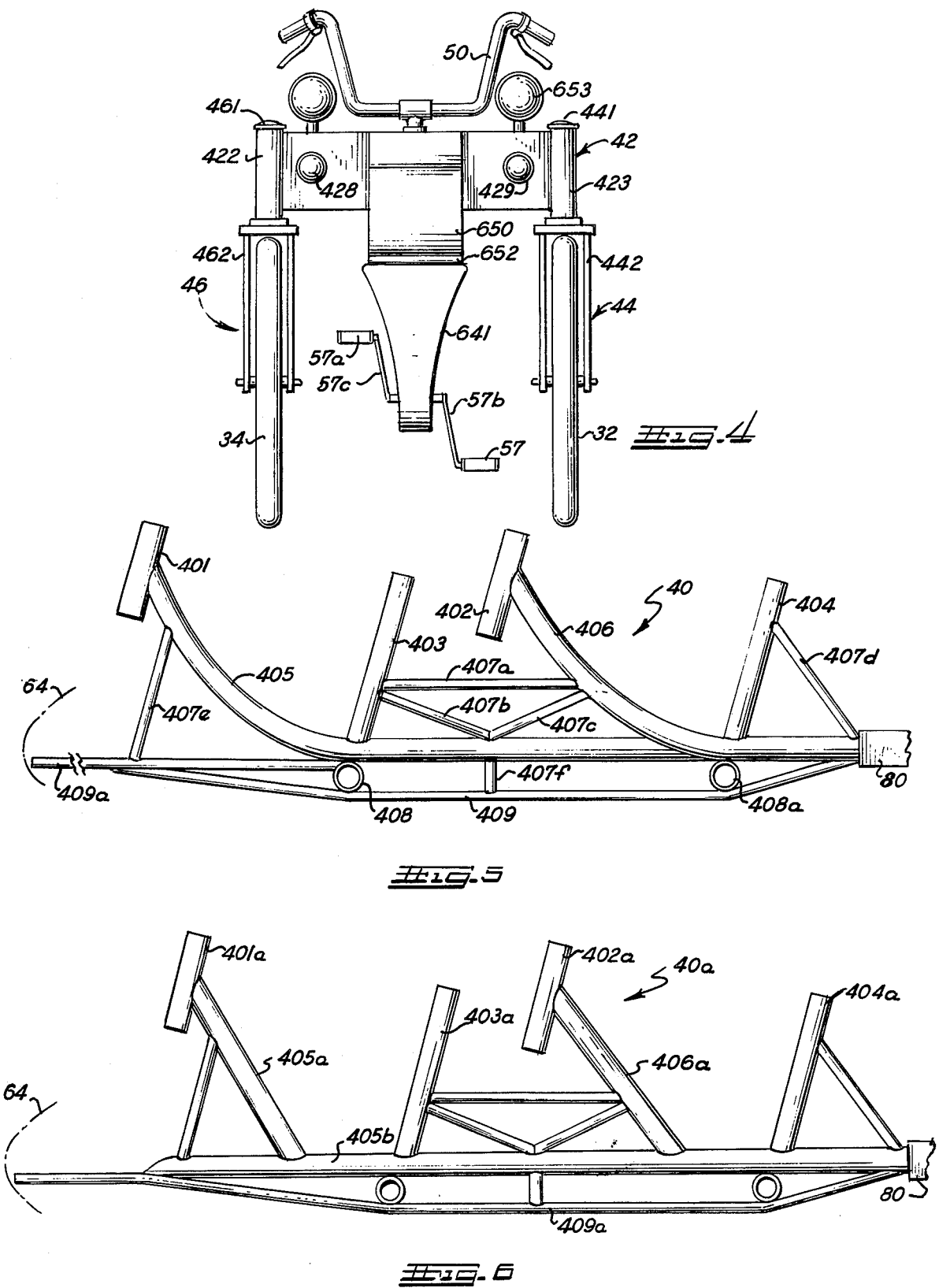

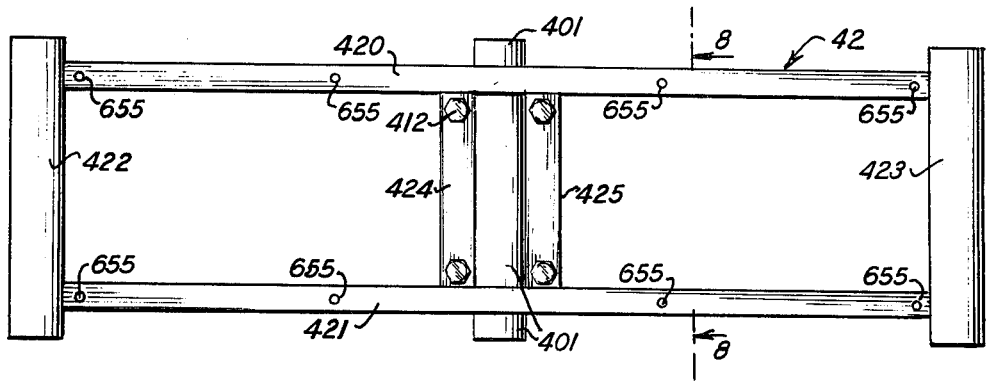
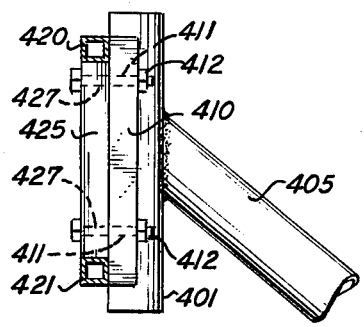 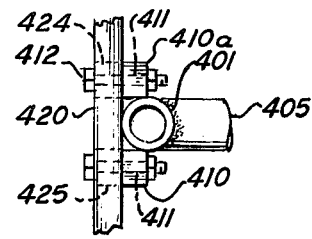
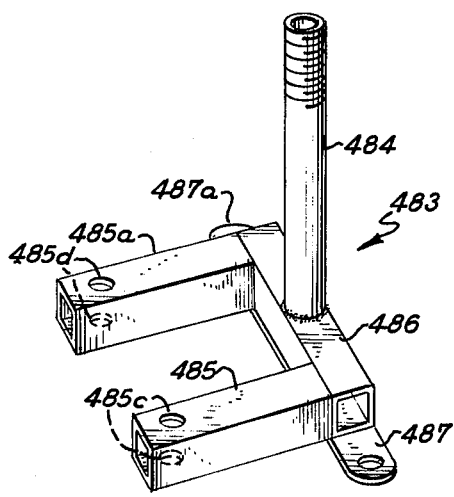 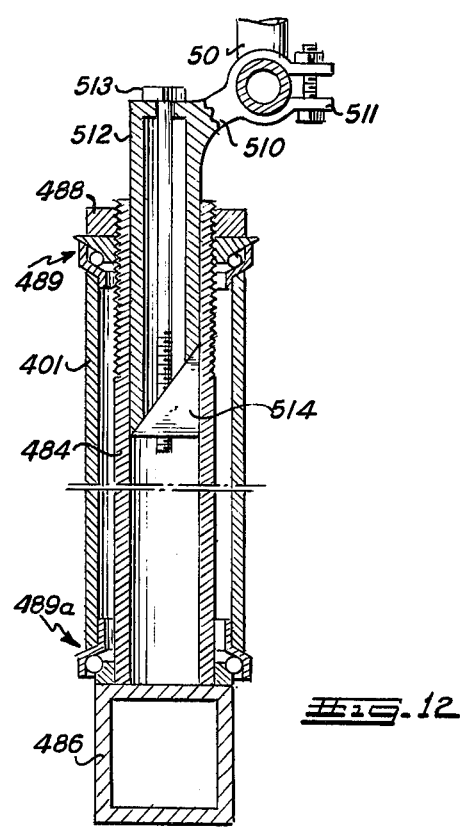

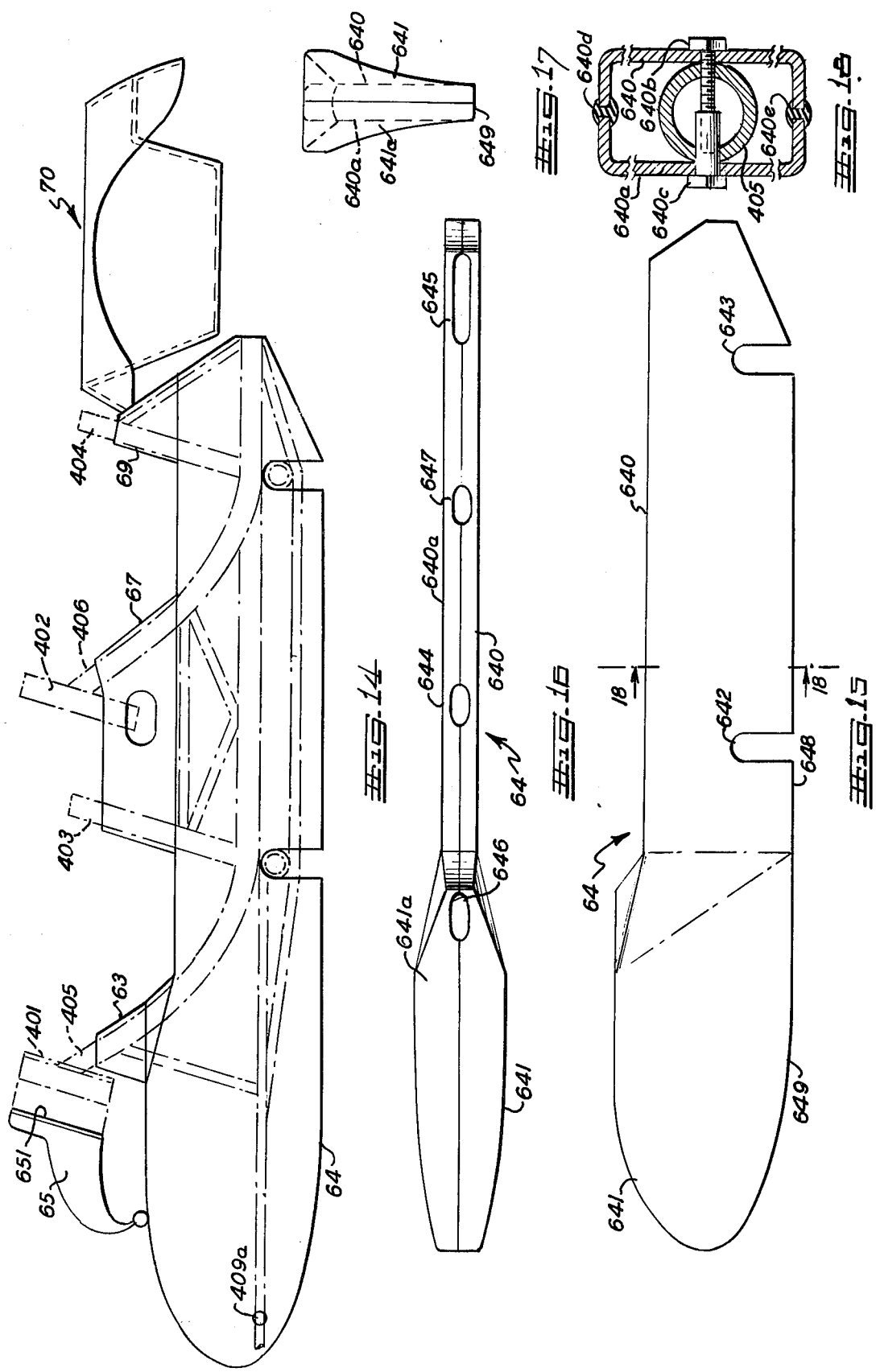

ized by the numeral 30. It gener-

FOUR WHEEL PEDAL DRIVEN VEHICLE

BACKGROUND OF THE INVENTION

This invention relates to a four wheel pedal driven vehicle particularly adapted to be steered and driven by one or two persons. Four wheel, pedal driven vehicles are known in the art, but generally, the vehicles are constructed by connecting two conventional bicycles in a parallel side-by-side relationship. Thus, pedal operation of the vehicle is accomplished by either one or both persons seated on the respective bicycles. Recent U.S. patents disclosing connected bicycles are U.S. Pat. Nos. 3,592,486, 3,516,686, 3,350,115, 3,175,843 and 2,694,582.

Various other types of pedal driven vehicles other than the typcial one person, two wheelers, or the connected ones referred to above, are also known in the art. Thus, when it is desired to have more than one person on a pedal driven vehicle, tandem-type vehicles are available which have two or more wheels and seats in line. The persons are seated behind each other and each can pedal the vehicle. Typical examples are shown in U.S. Pat. Nos. 3,132,872 and 3,075,788. Various three wheel vehicles are also known for carrying and being driven by two persons, i.e., U.S. Pat. No. 3,664,684.

The above mentioned vehicles, although providing means for accommodating more than one person on a pedal driven vehicle, have certain drawbacks. Thus, the connected bicycles are relatively very wide and normally both operators must steer, brake and pedal at the same time. Three-wheelers are somewhat unstable when making turns, whereas in line tandem-type vehicles are per se unstable and are difficult to operate by inexperienced persons. Thus, the art of balancing is required on tandem-type vehicles as well as on standard two wheel bicycles.

BRIEF DESCRIPTION OF THE INVENTION

The present invention provides a unique four wheel vehicle comprising seat and pedal means, pairs of front and rear wheels wherein each front wheel is mounted in a wheel fork, front spindle yolk assembly in combination with the front wheel forks, a steering control system in combination with said yolk assembly, a continuous drive chain assembly in combination with sprockets and pedals adapted to drive a rear axle drive assembly through transmission means, optional associated body shell and cowls, and other conventional means for pedal driven vehicles such as brakes, lights, etc.

In a preferred embodiment of the four wheel vehicle of this invention, tandem operator seats and pedal means, and tandem steering control means are provided whereby full steering and pedaling is provided at both operator positions. In addition, the vehicle is capable of being operated alone from either tandem position.

This invention will be best understood from the following description of a preferred embodiment thereof. However, it is understood that the invention is not limited to this precise form of vehicle, and that changes may be made therein without departing from the scope of the invention which is defined in the appended claims.

BRIEF DESCRIPTION OF THE DRAWINGS

FIG. 2 is a side elevational view of the four wheel vehicle shown in FIG. 1;

FIG. 3 is a top plan view of the four wheel vehicle shown in FIG. 1;

FIG. 4 is a front and elevational view of the four wheel vehicle shown in FIG. 1;

FIG. 5 is a side elevational view of a unitary frame assembly embodied as part of the vehicle of FIG. 1;

FIG. 6 is a side elevational view of an alternate unitary frame assembly;

FIG. 7 is a front elevational view of the front spindle yoke assembly connecting the front wheel forks;

FIG. 8 is a view taken along line 8—8 of FIG. 7;

FIG. 9 is a top partial view of the yoke assembly showing how it is connected to a front handle bar housing of the frame assembly;

FIG. 11 is a perspective view of the front steering post;

FIG. 12 is a cross-sectional side view showing the detail of how the front steering post and handle bars are mounted within the front handle bar housing;

FIG. 14 is a side elevational view of the optional body shell assembly, as assembled on the frame (shown in phantom) and including the forward cowl, forward post cowl, central post cowl, rear post cowl, and the rear carrier box;

FIG. 15 is a side elevational view of the body shell shown in FIG. 14;

FIG. 16 is a top plan view of the body shell;

FIG. 17 is a front elevational view of the body shell;

FIG. 18 is an enlarged section taken along line 18—18 of FIG. 15 showing the means by which the body shell is secured to the frame;

DETAILED DESCRIPTION OF THE PREFERRED EMBODIMENT OF THE INVENTION

Figure 1:
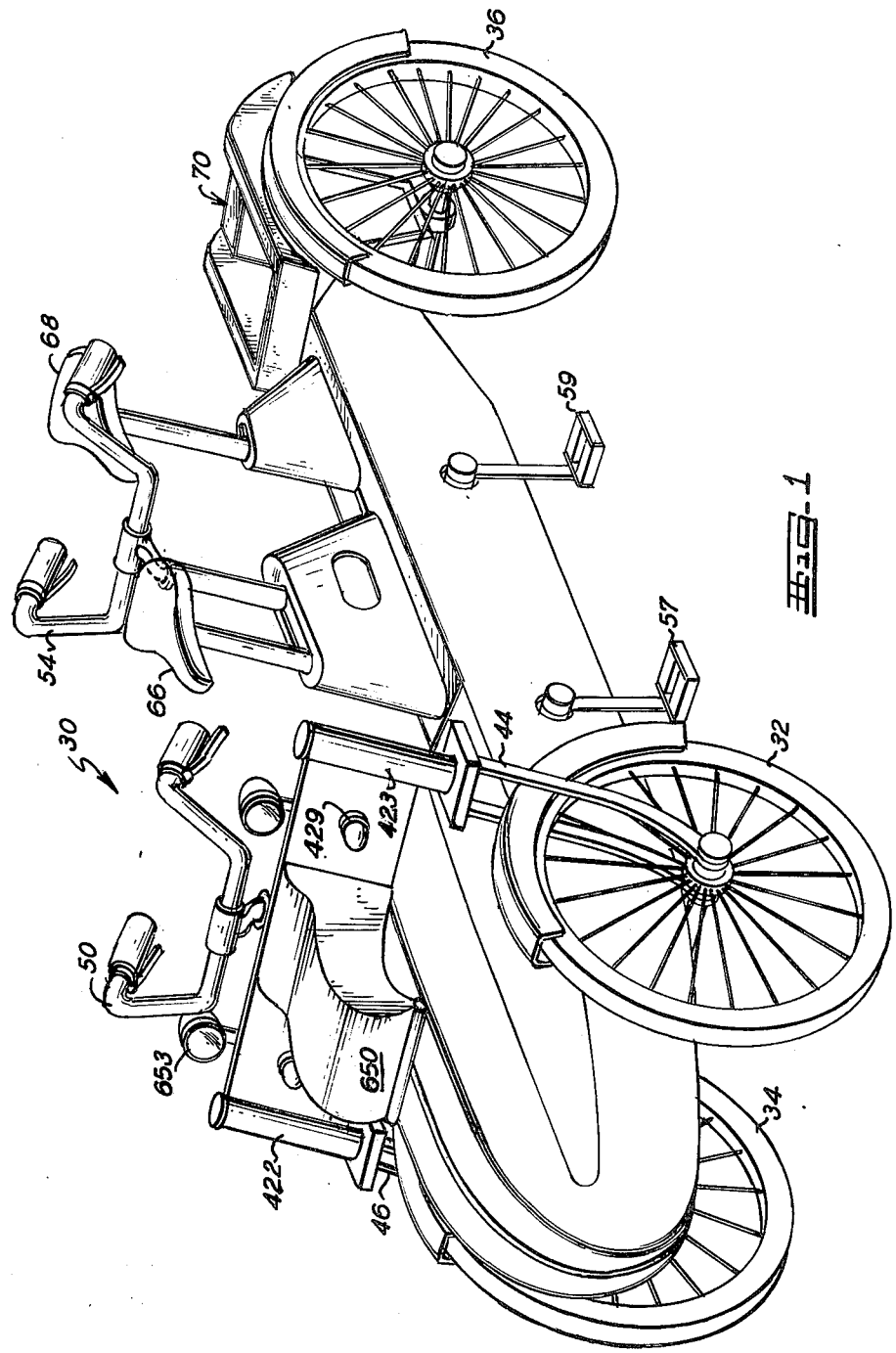
FIG. 1 is a perspective view of the four wheel vehicle of the invention shown with optional body shells and a front cowl assembly, and an optional rear carrier box.
Figure 13:
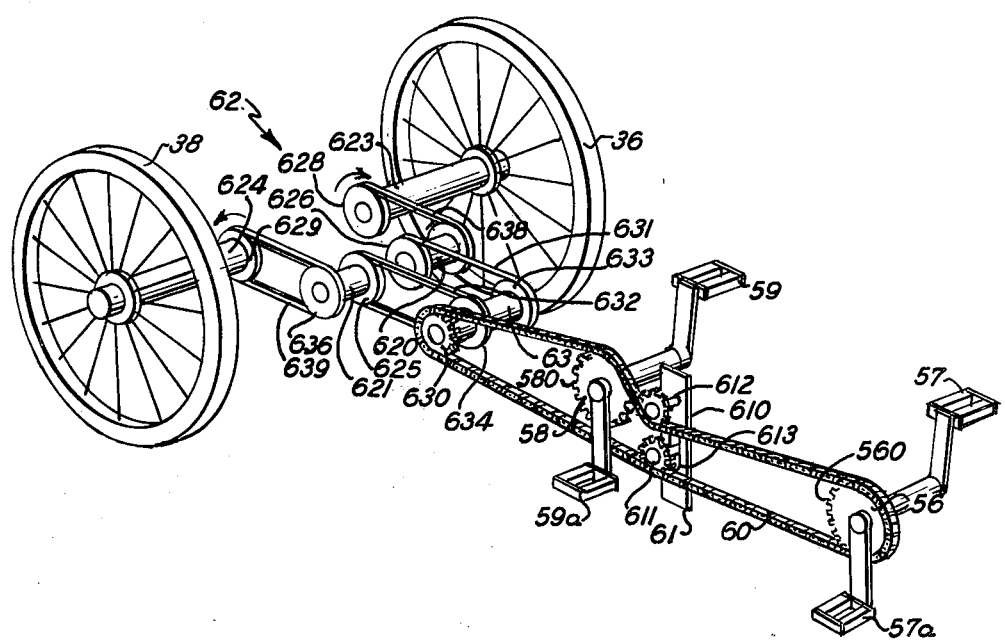
FIG. 13 is a schematic perspective view of the rear axle drive and transmission system, and the chain drive and the pedal system.
Figure 24:
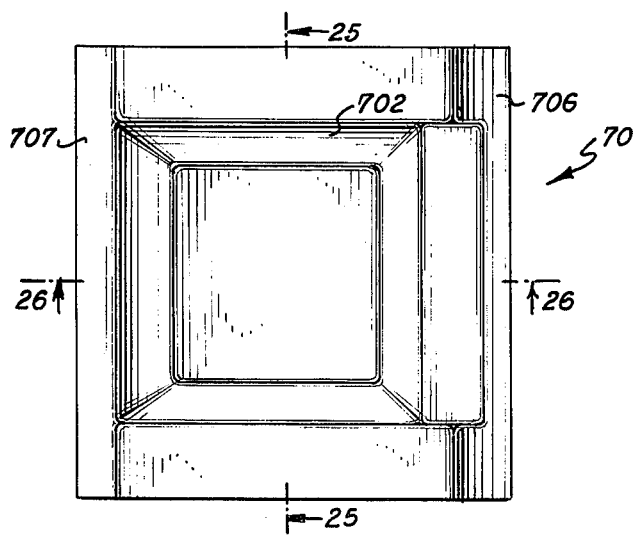
FIG. 24 is a top plan view of the carrier box.
Figures 25, 26:
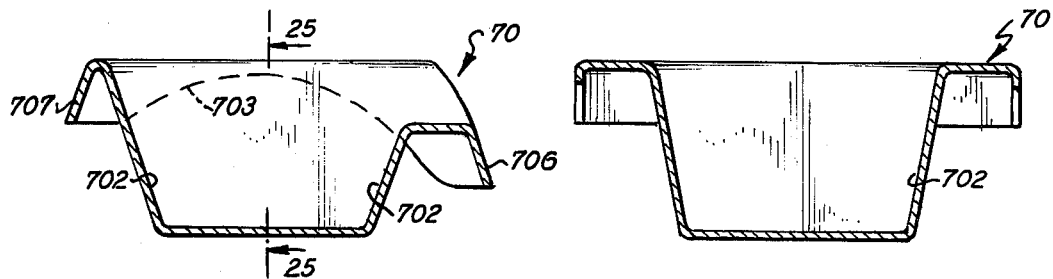
FIG. 25 is a section taken along line 25—25 of FIG. 24.
FIG. 26 is a section taken along line 26—26 of FIG. 24.

The following is a detailed description of a preferred embodiment of the invention wherein the four wheel vehicle is adapted for use by two persons seated in tandem. In the drawings, the four wheel vehicle is shown in perspective in FIG. 1 and in FIGS. 2, 3 and 4 and is generally designated by the numeral 30. It generally comprises a pair of front parallel wheels 32 and 34; a pair of rear parallel wheels 36 and 38; a frame 40 (FIGS. 5 and 6); a front spindle yoke assembly 42 (FIG. 7) in which are mounted wheel fork members 44 and 46 (FIG. 4); a steering system (FIG. 10) comprising a front steering assembly 48, rear steering assembly 49 and a control cable assembly 52; front handle bars 50 and rear handle bars 54; sprockets 56 and 58 comprising pedals 57, 57a and 59, 59a respectively, and drive chain assembly 60 (FIG. 13); rear drive system 62 (FIGS. 13, 13A, 13B and 13C) comprising rear axle drive train assembly and transmission system; optional body shell 64 and cowl assemblies (FIGS. 14–23); front and rear saddle seats 66 and 68; and optional carrier box 70 (FIGS. 24, 25 and 26). Additional aspects of the four wheel vehicle will be apparent hereinafter.

The frame 40 (FIG. 5) of the four wheel vehicle is unitary and comprises front and rear handle bar housings 401 and 402, front and rear seat mast housings 403 and 404, front and rear downwardly curving bar members 405 and 406, suitable brace members 407a, b, c, d, e and f and front and rear crank housings 408 and 408a disposed above a lower tension brace member 409. Front brace members 409a extends forwardly of the frame and terminates at a point just beyond the front wheels (see FIG. 2). Bumper means (not shown) can be assembled thereon when a body shell is not used on the vehicle.

The alternate frame assembly 40a shown in FIG. 6 is in many respects similar to frame 40 of FIG. 5 except that the front and rear bar members 405a and 406a are straight instead of being curved as are bar members 405 and 406, and a straight bar members 405b provides support for the various housings 403a, 406a, 404a, etc.

A front wheel spindle yoke assembly 42 (FIGS. 4, 7, 8 and 9) is detachably secured to front handle bar housing 401. Yoke assembly 42 comprises a rectangular framework of horizontal, square, cross bar members 420 and 421 connected at each end to vertical wheel fork housings 422 and 423. Vertical square bar members 424 and 425 are disposed near the midpoint of the framework of the yoke assembly. Pairs of holes 427 are provided through members 424 and 425. Housing 401 is provided with members 410 and 410a which are welded on each side of the housing 401. Members 410 and 410a are provided with holes 411 which are adapted to match with holes 427. The yoke assembly 42 is rigidly secured to the housing 401 by means of nuts and bolts 412 inserted through holes 427 and 411. Bar members 420 and 421 are also provided with a series of holes 655 for securing the forward dash cowl as will be described hereinafter.

Figure 10:
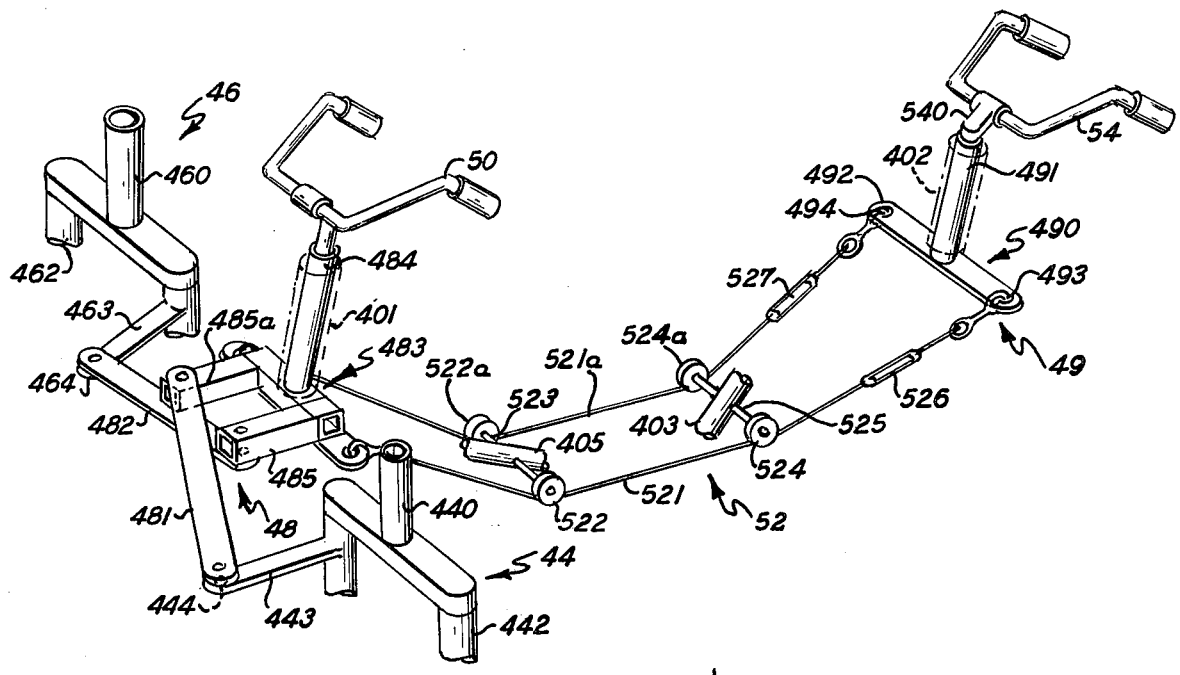
FIG. 10 is a schematic perspective view of the steering system assembly.

Referring to FIGS. 10 through 12, there is shown the assembly details of the front wheel forks 44 and 46 pivotally connected to the wheel fork housings 422 and 423 of the yoke assembly 42. Also shown are the details of the front steering system 48 connected to the front handlebars through the front handle bar housing 401 of the frame, and to the front wheel forks, whereby the wheel forks can be turned in either direction in unison.

Each wheel fork member 44 and 46 comprises a post 440 and 460 respectively, adapted to be inserted into wheel fork housings 423 and 422, respectively, and pivotally secured therein by suitable bearing and retaining means 441 and 461, respectively. Each wheel fork member 44 and 46 comprises a pair of forks 442 and 462, respectively, in which wheels 32 and 34 are conventionally mounted. Each wheel fork member comprises a steering arm 443 and 463 having holes 444 and 464, respectively, adapted to be pivotally connected to the front steering assembly 48.

Front steering assembly 48 of the steering system comprises a pair of crossover, control link members 481 and 482 each containing holes at both ends (FIG. 10) and a front steering member 483 (FIG. 11). Steering member 483 comprises a hollow, externally threaded vertical tubular post 484 rigidly connected to cross member 486 which in turn contains arms 485 and 485a containing holes 485c and 485d. Cross member 486 is provided with fittings 487 and 487a at both ends and each comprising a hole adapted to be connected to a tandem control cable assembly 52 which is connected to the rear steering assembly 49 to be described hereinafter. Crossover link member 481 is pivotally connected by conventional means to arm 443 and arm 485a. Crossover link member 482 is similarly pivotally connected to arm 463 and arm 485.

In FIG. 12, the assembly of the post 484 of steering member 483 within handle bar housing 401 of the frame and to the front handle bars 50 is shown. Post 484 is pivotally retained within housing 401 by a threaded locknut 488 and by an upper and lower conventional bearing assembly 489 and 489a comprising outer bearing seal cups, inner cones, ball bearing races, etc. The front handle bars 50 are disposed within conventional arm means 510 comprising a tightening bracket 511, a vertical post 512 and a conventional cam lock 514. The post 512 is inserted into the hollow tubular post 484 of front steering member 483. Post 512 is conventionally tightened within post 484 by a lock-up bolt 513 fitted into the internal screw cam lock 514.

The front steering assembly 48 is adapted to be connected in tandem with the rear steering assembly 49 by means of the control cable assembly 52 to be described hereinafter. The rear assembly 49 comprises rear handle bars 54 which are pivotally disposed within conventional arm means, tightening bracket and post means 540 similarly as front handle bars 50. A rear steering member 490 comprises an externally threaded hollow post 491 adapted to be pivotally retained within housing 401 of the frame similarly as post 484 of front steering member 483. Post 491 is rigidly secured to cross member 492 which is provided with holes 493 and 494 at each end. Post 540 is adapted to be retained in post 491 similarly as post 512 in post 484 of the front steering assembly 48.

The control cable assembly 52 connects the front steering member 483 with the rear steering member 490 by means of a pair of tension tie cables 521 and 521a. Cable 521 is connected at one end to fitting 487 of front steering member 483 and at the other end to hole 493 of rear steering member 490. Similarly cable 521a is connected between 487a and 494. The cables pass under front cable guide pulleys 522 and 522a which are pivotally mounted on a cross member 523, which is rigidly connected to frame bar member 405. Similarly the cables pass under rear cable guide pulleys 524 and 524a which are pivotally mounted on a cross member 525 which is rigidly connected to front seat mast 403. The cables are provided with conventional tensioning turnbuckles 526 and 527.

FIGS. 13, 13A, 13B and 13C disclose details of the drive system including the drive chain assembly 60 and the rear axle drive assembly 62 comprising the axle drive train and transmission system. The drive chain assembly comprises drive chain 60, front drive sprocket 56 with pedal cranks 57 and 57a, rear drive sprocket 58 with pedal cranks 59 and 59a, and tension adjusting bar means 61 (connected to the frame) containing idler sprockets 611 and 612. The chain tension adjustment can be made by arranging for bar 610 to swivel (not shown) or by providing, as shown, a slot 613 in fixed bar 610 in which idler sprocket is adjustable in the slot to maintain the required tension in the drive chain. The drive chain 60 is a single loop, which is continuous around the teeth 560 and 580 of drive sprockets 56 and 58, respectively, idler sprockets 611 and 612, and sprocket 630 of the rear drive train assembly 62.

The rear drive assembly 62 is adapted to comprise various drive systems such as single speed or multiple speed. In the embodiment shown a multiple speed forward drive and single speed reverse drive is depicted and comprises rear drive split-axle assemblies 623 and 624 containing axle housings, bearings and inner drive axles which drive rear wheels 36 and 38, respectively. The transmission of the drive system 62 comprises a multiple speed, internal geared hub and shaft assembly 620 which is controlled by the vehicle operator by various means such as cable control and shift means 622 (FIG. 2) for various forward speed drives which drives wheel 36 and which is free wheeling in reverse speed. Reverse speed is provided by single speed, drive hub and shaft assembly 621 which drives wheel 38 and which is free wheeling in the forward speeds. Both assemblies 620 and 621 are driven by a jack shaft drive sprocket cluster unit drive assembly 63 which in turn is driven by the main drive chain engaging sprocket 630. Intermediate drive chains 631 and 632 operate the speed change gear hubs with free wheeling ratchets. Thus, at all times, hub 633 of assembly 63 is connected with a hub 626 of assembly 620 for forward speed drives and the other hub 634 of 63 is connected with hub 625 of assembly 621 for reverse drive. Final drive chain 639 connects hubs 636 and 629 and final drive chain 638 connects hubs 627 and 628. With chain drives, sprocket discs, as shown, are disposed by weldments on the hub housings. Transmission belts (not shown) can be used instead of chains 636 and 638 for the final drives. In this case, the belts drive from the hub housings as spools to pulley spools on the rear split axles.

With the described transmission assembly and rear axle drive, forward pedaling provides forward movement of the vehicle and reverse pedaling provides reverse movement of the vehicle.

Figure 13A:
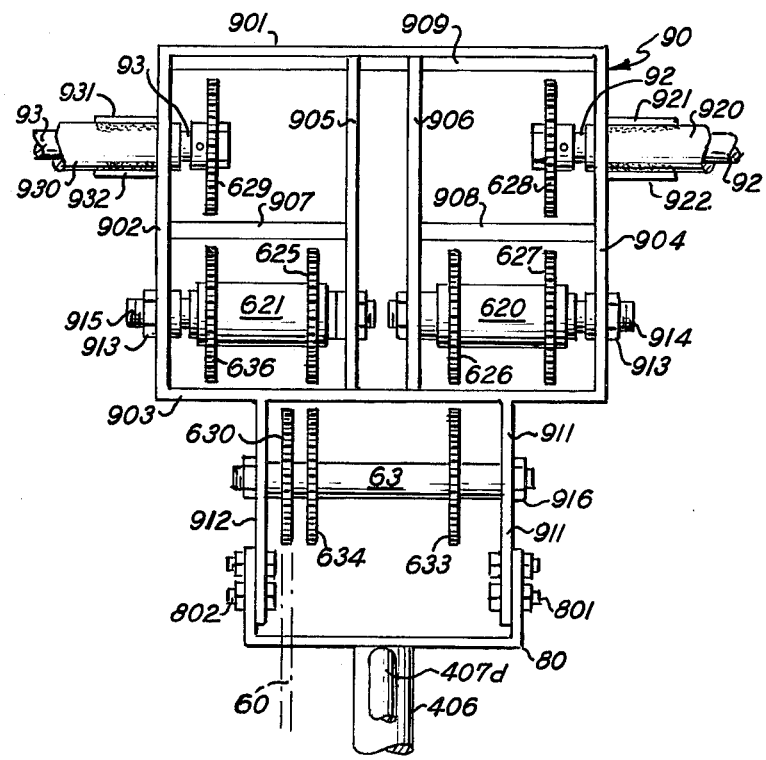
FIG. 13A is a diagrammatic top plan view of the rear axle drive and transmission assembly.
Figure 13B:
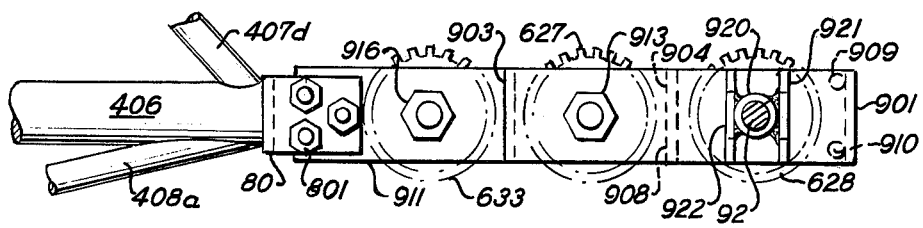
FIG. 13B is an elevational view taken from the right side of FIG. 13A.
Figure 13C:
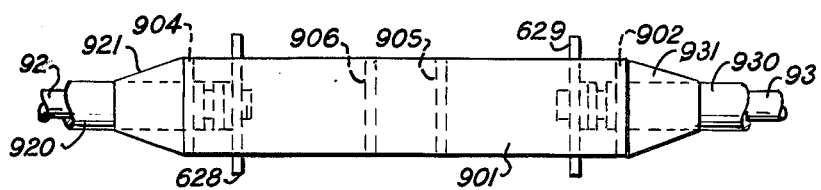
FIG. 13C is a rear elevational view showing details of the rear drive axle assembly.

The transmission and split rear axle assembly is housed in a framework shown generally by the numeral 90 in FIG. 13a attached to the rear of the main frame 40 of the vehicle. A C-clamp 80 is rigidly secured as by welding to the end of bar member 406 of the frame 40. Framework 90 is a rectangular assembly of metal plate members welded together to form a rigid housing for the transmission gears and split axles. The framework comprises plate members 901, 902, 903 and 904 forming the outer framework, and intermediate plate members 905, 906, 907 and 908. To provide additional structural rigidity to the framework tubular bar members such as 909 and 910 can be disposed at various parts of the framework. A pair of integral plate members 911 and 912 extend forwardly of the framework and are adapted to be rigidly secured to the C-clamp 80 by means of nuts and bolts such as 801 and 802.

The drive hub and shaft assemblies 620 and 621 are disposed and secured to the various plate members within the framework 90 by suitable means such as bolts, washers, etc., 913, secured to shafts 914 and 915 respectively of the assemblies. Similarly, jack shaft assembly 63 is disposed and secured within and between plate members 911 and 912 by bolts 916.

The split axles 92 and 93 rigidly connected to hub assemblies 628 and 629, respectively, are disposed within axle housings 920 and 930, respectively, containing conventional and suitable bearing means. The axle housings 920 and 930 are rigidly secured, as by welding, to and through the plate members 904 and 902 respectively. To provide additional strength and rigidity to the axle housing as connected to the framework 90, gussets 921, 922, 931 and 932 are provided welded to both the axle housing and framework 90.

A typical braking system is provided comprising standard bicycle wheel rim brakes on all wheels which are controlled by suitable housing and cables operated by hand brake levers 540 and 500 on the rear and forward handle bars.

Saddle posts 660 and 680 of saddles 66 and 68 are adapted to fit and be adjustable by conventional clamps in seat masts 403 and 404, respectively, of the frame 40.

In FIG. 14 there is disclosed the body shell 64 and the various cowls 63, 65, 67 and 69 as assembled on the frame 40 as well as the carrier box 70. In FIGS. 15 through 18, there are shown the details of body shell 64 which comprises split elongate body sections 640 and 640a having forward wider sections 641 and 641a and suitable pedal crank openings 642 and 643 on both sections through which the forward and rear pedal cranks 57b, 57c, 59b and 59c can extend. At the top portion of the respective sections holes 644 and 645 are provided to permit the seat masts 403 and 404 to protrude. Similarly holes 646 and 647 are provided to permit the tubular bars 405 and 406, respectively, to protrude. The bottom section 648 of mated sections 640 and 640a is open whereas the bottom portion 649 of mated sections 641 and 641a is closed. The split shell sections 640 and 640a can be mated together on the frame by suitable means and particularly as shown in FIG. 18 which is a cross section through the body shell as shown in FIG. 15, but also including a section through frame member 405. The two sections and frame member 405 are provided with in-line holes through which interfitting bolt members 640b and 640c can be inserted thereby securing the two sections to the frame member. Rubber or plastic beads or strips 640d and 640e can also be provided where the two sections meet.

Figures 19, 21:
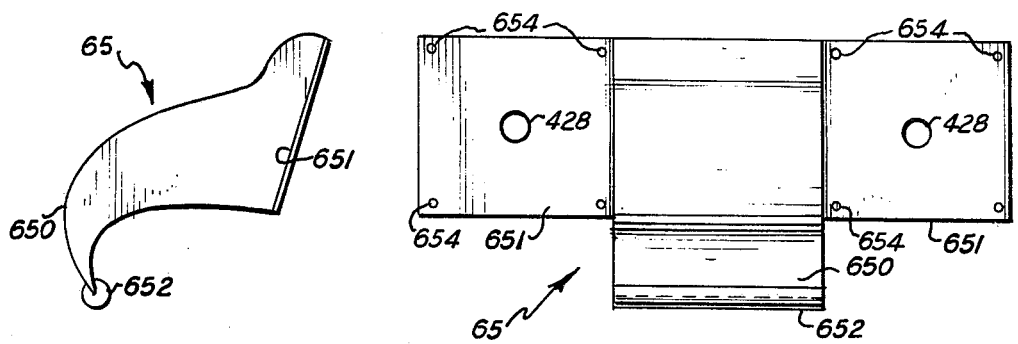
FIG. 19 is a front elevational view of the forward dash cowl.
FIG. 21 is a side elevational view of the forward dash cowl.
Figure 20:
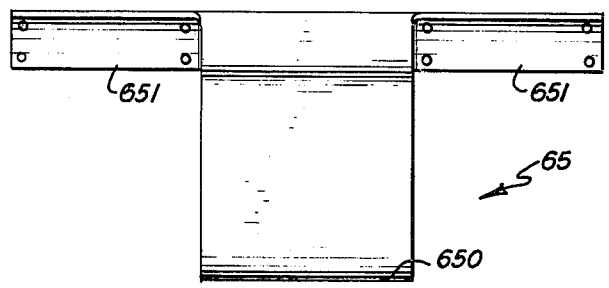
FIG. 20 is a top plan view of the forward dash cowl.

In FIGS. 19 through 21 the details of the forward dash cowl 65 are disclosed. It comprises a hollow forwardly extending, downwardly curving section 650 suitably secured to a transverse section 651. Section 651 is adapted to be secured to the yoke assembly 42 by means of sheet metal drive screws screwed into hole 654 and into hole 655 of the yoke. Section 650 is adapted to be disposed at its leading edge, which contains a rubber bead 652, on the top of sections 641 and 641a of the body shell 64. The dash cowl 65 can contain cutout holes 428 for optional installation of front turn signals such as 429 shown in FIG. 1, and is adapted to encompass wiring from head lights 653, cables, etc.

Figure 23:
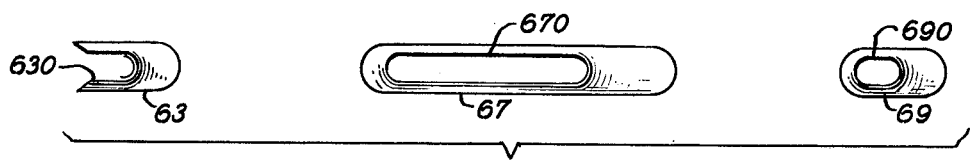
FIG. 23 is a top plan view of the cowls shown in FIG. 22.
Figure 22:
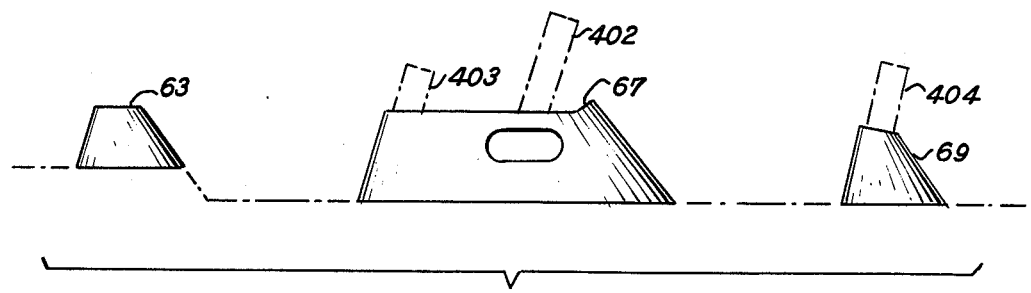
FIG. 22 is a side elevational view of the front post cowl, central post cowl and rear post cowl.

In FIGS. 22 and 23, the details of three post cowls 63, 67 and 69 are disclosed. Front post cowl 63 is adapted to have tubular frame bar member 405 protrude through cutout portion 630, central cowl 67 is adapted to have seat mast 403 and housing 402 with bar member 406 protruding through elongated slot 670, and rear post cowl 69 is adapted to have seat mast 404 protruding through hole 690. All the post cowls are open at their bottom sections and are adapted to be secured by suitable means to the top of the body shell 64.

In FIGS. 24–26, an optional carrier box 70 is disclosed which can be removably secured to a carrier support frame means 701 which is secured to the rear wheel axle housings 921 and 931. The carrier box comprises a well 702, curved side panel sections 703 adapted to fit over the fenders and rear wheels, a forward panel section 707 adapted to be disposed near cowl 69, and a rear panel section 706.

From the foregoing description of a preferred embodiment of the invention, it will be appreciated that a highly unique four wheel vehicle has been defined. Thus, the four wheeler concept provides a stable, lightweight integral vehicle assembly and optional body shell and cowls. The vehicle is easily operated by either one or two persons riding in tandem, and the operations can be controlled from either tandem position. The unique steering system provides for steering control from either position as well as braking, etc. The unique continuous chain drive means provides for pedal drive from either or both positions. The vehicle can also be driven by only one person operating the pedals and steering from either tandem position.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A four wheel vehicle having tandem operator position comprising:
  a. a unitary, longitudinal, integral frame including front and rear handle bar housings, front and rear seat mast housings, front and rear crank housings, and a rear clamp member;
  b. a front yoke assembly having its mid-section rigidly secured to said front handle bar housing, said yoke assembly including right and left fork housings at its right and left ends respectively;
  c. right and left forks pivotally mounted in said right and left fork housings respectively;
  d. right and left front wheels mounted on said right and left forks respectively;
  e. a vertical post pivotally mounted in said front handle bar housing, front handle bars mounted on the upper end of said vertical post, a horizontal U-shaped member integral with the lower end of said vertical post;
  f. right and left arms mounted on said right and left forks respectively, cross link members pivotally connected between the horizontal legs of said U-shaped member and said right and left arms respectively;
  g. an upright post pivotally disposed in said rear handle bar housing, rear handle bars mounted on the upper end of said upright post, a cross member rigidly connected to the lower end of said upright post;
  h. parallel cables connected between said U-shaped member and said cross member respectively whereby steering is provided from either or both of said tandem operator positions;
  i. front and rear pedal sprockets disposed in said front and rear crank housings respectively, front and rear seats disposed in said front and rear seat mast housings respectively;
  j. a rear framework connected to said rear clamp member, right and left axles rotatably mounted in said rear framework, right and left rear wheels mounted on said right and left axles respectively;
  k. a multiple speed transmission means mounted on said rear framework, said transmission means including an input drive sprocket and output means drivingly connected to said right and left axles, operator control means for shifting said transmission means;
  l. a continuous, single loop drive chain engaging said front and rear pedal sprockets and said input drive sprocket, whereby said vehicle can be pedal driven and steered from either or both of said tandem operator positions.

2. The vehicle of claim 1 wherein said multiple speed transmission means comprises a jack-shaft cluster unit drive assembly connected to said input drive sprocket, said cluster unit connected to multiple speed forward hub and shaft means and to single speed reverse hub and shaft means, said forward hub and shaft means connected to said left rear axle wherein said left wheel is driven in a forward direction and is free wheeling in the reverse direction, said reverse hub and shaft means connected to said right axle wherein said right wheel is driven in a reverse direction and is free wheeling in the forward direction.

3. The vehicle of claim 1 comprising fixed idler sprockets to maintain required tension in said chain means.

* * * * *